(12) United States Patent
Karlsson et al.

(10) Patent No.: US 8,391,892 B2
(45) Date of Patent: Mar. 5, 2013

(54) METHOD OF PROVIDING ACCESS TO PRESENCE RELATED INFORMATION

(75) Inventors: Petter Karlsson, London (GB); Dominic Butler, London (GB)

(73) Assignee: Nokia Corporation, Espoo (FI)

( * ) Notice: Subject to any disclaimer, the term of this patent is extended or adjusted under 35 U.S.C. 154(b) by 109 days.

(21) Appl. No.: 11/550,555

(22) Filed: Oct. 18, 2006

(65) Prior Publication Data

US 2007/0087762 A1   Apr. 19, 2007

Related U.S. Application Data

(63) Continuation of application No. 10/503,194, filed as application No. PCT/GB03/00448 on Feb. 3, 2003, now abandoned.

(30) Foreign Application Priority Data

Feb. 1, 2002   (GB) .................................. 0202371.1

(51) Int. Cl.
*H04W 24/00* (2009.01)
(52) U.S. Cl. ................ 455/456.2; 455/414.1; 455/422.1
(58) Field of Classification Search ............... 455/414.1, 455/456.2, 422.1
See application file for complete search history.

(56) References Cited

U.S. PATENT DOCUMENTS

| | | | |
|---|---|---|---|
| 6,023,762 A * | 2/2000 | Dean et al. ..................... | 713/193 |
| 6,226,589 B1 | 5/2001 | Maeda et al. | |
| 6,311,069 B1 * | 10/2001 | Havinis et al. ............. | 455/456.4 |
| 6,697,840 B1 * | 2/2004 | Godefroid et al. ............ | 709/205 |
| 6,981,223 B2 * | 12/2005 | Becker et al. .................. | 715/753 |
| 7,640,318 B1 | 12/2009 | Hull et al. | |
| 2001/0020239 A1 | 9/2001 | Ukigawa et al. | |
| 2001/0042126 A1 * | 11/2001 | Wong et al. .................... | 709/229 |
| 2002/0090911 A1 * | 7/2002 | Evans et al. ..................... | 455/41 |
| 2002/0111172 A1 * | 8/2002 | DeWolf et al. ................ | 455/456 |
| 2003/0008659 A1 * | 1/2003 | Waters et al. .................. | 455/456 |

FOREIGN PATENT DOCUMENTS

| | | |
|---|---|---|
| DE | 19961510 A1 | 6/2010 |
| JP | 10-124428 A | 5/1998 |
| JP | 2000-259995 A | 9/2000 |
| JP | 2001-134612 A | 5/2001 |
| JP | 2001-147891 A | 5/2001 |
| JP | 2001-168958 A | 6/2001 |
| JP | 2001-243413 A | 9/2001 |
| JP | 2001-268246 A | 9/2001 |

OTHER PUBLICATIONS

Japanese Office action for corresponding JP application No. 2003-565146 dated Jan. 25, 2011, pp. 1-8.
Japanese Office action for corresponding JP application No. 2003-565146 dated May 9, 2011, pp. 1-7.

* cited by examiner

*Primary Examiner* — Kwasi Karikari
(74) *Attorney, Agent, or Firm* — Ditthavong Mori & Steiner, P.C.

(57) ABSTRACT

Presence information for a user is stored and made accessible using a conventional client server or peer to peer Presence model. The identity of any entity that requests or accesses this Presence information is however legged and then automatically provided to a wireless information device operated by the user. This enables the device to display the identity of the entity that requested or accessed the Presence information and hence (a) can prompt a user to contact the entity that sought his Presence information and (b) inhibits inappropriate accessing of Presence information.

14 Claims, 4 Drawing Sheets

METHOD OF PROVIDING ACCESS TO PRESENCE RELATED INFORMATION

CROSS REFERENCE TO RELATED APPLICATIONS

This application is a continuation of U.S. application Ser. No. 10/503,194, filed Jul. 30, 2004, which claims the priority of PCT Application No. PCT/GB03/00448 filed on Feb. 3, 2003, and British Application GB 0202371.1 filed on Feb. 1, 2002, the contents of which are hereby incorporated by reference.

BACKGROUND OF THE INVENTION

1. Field of the Invention

This invention relates to a method of providing access to presence information. 'Presence' information refers to private user data which gives information and hints about a user's current state, including location, availability and mood. The term 'wireless information device' used in this patent specification should be expansively construed to cover any kind of device with one or two way communications capabilities and includes without limitation radio telephones, smart phones, communicators, personal computers, computers and application specific devices. It includes devices able to communicate in any manner over any kind of network, such as GSM or UMTS mobile radio, Bluetooth™, Internet etc.

2. Description of the Prior Art

Current generation wired and wireless telephones can indicate to a caller the status of a call recipient in only crude and potentially ambiguous terms: for example, when a caller makes a voice call, he or she might receive one of five different responses: (a) the desired call recipient answers; (b) there is no answer; (c) there is an engaged tone; (d) the call gets put through to a prerecorded voice mail message or (e) the call gets diverted to someone else. If the intended call recipient does not actually answer the call, then the caller has no idea why the call was not answered: for example, is the intended recipient in fact there but too busy to answer? Could a different number have been dialled to connect successfully?

Conventional so-called 'Presence' systems are the subject of considerable interest at present and partly solve the above problems. The intent of Presence systems is to show the status of the prospective call recipient to a calling party ahead of the caller making the call—for example, giving information about whether the intended call recipient is busy, in a meeting, contactable on a mobile phone or land line, giving hints about the way the call recipient would prefer to be contacted (voice, SMS etc). Reference may be made to RFC 2778 'A Model for Presence and Instant Messaging' February 2000, The Internet Society.

Presence information will typically be stored on one or more servers controlled by a wireless operator, people can post their Presence information onto these servers directly from their own wireless information devices; some kinds of Presence information may also be determined automatically, such as the location of the device. Someone seeking Presence information relating to (or 'owned') by another can access these servers. Peer to peer variants are also possible, with an individual storing his or her Presence information on his or her own wireless information device, which can give access to that information to other wireless information device or servers that wish to pull down this information. Various kinds of access control to different kinds of information can be provided, so that a user might give access to certain Presence information only to a defined group of friends or family; for example, location information might be available only to persons the user has classified as dose friends, whereas availability information might be accessed by a broader group. Reference may be made to PCT/GB01/03784 filed by the present applicant, which describes a comprehensive Presence architecture and is incorporated by reference into this disclosure. Further reference may also be made to PCT/GB01/03804 again filed by Symbian Limited, which discloses an extensible database architecture suitable for the fast and efficient deployment of the present invention and is again incorporated by reference into this disclosure.

Despite a user's ability to limit access to his/her own Presence data to defined users and classes of users, one of the disadvantages of Presence systems is the perceived lack of control that the user has over his Presence information. That lack of control is clearly greater where a user has not implemented any of the conventional access control features described above, perhaps because doing so is seen as complicated, or has made some Presence information 'public' and hence can be accessed by anyone (this might include basic availability information).

SUMMARY OF THE PRESENT INVENTION

In a first aspect of the present invention, there is a method of providing access to Presence information comprising the following steps:
  (a) storing Presence information for a user and making that information accessible;
  (b) logging the identity of any entity that requests or accesses the Presence information;
  (c) automatically providing data to a wireless information device operated by the user to enable that device to display the identity of the entity that requested or accessed the Presence information.

There are two main advantages to a user: First, conventional systems provide no technical solution to the problem of alerting a user to the fact that an entity might be interested in contacting him or her; with the present invention, where communication between the entity and the user has not happened (perhaps due to adverse Presence information—e.g. the user has stated that he is in a meeting—or poor network coverage) then the user can readily see that the entity was at least considering communicating with him or her because the entity viewed his or her Presence information; the user can then contact the entity directly if he or she wishes. Secondly, because a user is aware of whenever an entity accesses his Presence information, that tends to give the user a greater feeling of control over that information: it can only be accessed with his knowledge. A related consequence is that the inappropriate accessing of Presence information is inhibited.

Currently, mobile telephones display a 'missed calls' alert, giving a user a greater sense of being connected and also the practical option of returning those calls. The present invention proposes an equivalently useful new functionality, namely logging and displaying on the user's wireless information device the identity of anyone accessing the user's Presence information.

In a typical implementation of the present invention, Presence information is stored on server based databases controlled by a wireless network operator; those servers can be programmed to log all access requests to Presence information (e.g. identity of person accessing the Presence information, the nature of Presence information accessed, the time/date of access) and to provide that information to the relevant user's wireless information device by sending it. This may be on an automatic, immediate basis whenever Presence information is requested; at regular intervals; at pre-defined times; or when polled/requested by the device. Appropriate user selectable menu options are displayed on the device to enable the user to select the appropriate approach. That device is then programmed to display the fact that Presence information has been requested or accessed and to give the user the option of viewing the log. The server based databases may be programmed to automatically deny access to Presence information from pre-defined categories of entities (e.g. black-listed persons, entities not listed in the user's contact list stored on the database; commercial organisations etc.), so that it is useful to be able to inform a user not only when Presence information has been accessed, but also when it has been requested and denied.

A peer to peer approach is also possible: The Presence data is then not stored on a central database server and managed centrally by the database server owner (e.g. network operator), but is distributed across wireless information devices such that the Presence information for any given user is stored on and managed by software on that user's wireless information device. The software will act as the above-mentioned server software, meaning it will handle Presence information requests from other users, it will log Presence information requests, may be programmed or otherwise configured by the user to deny/permit requests from given users, will facilitate communication with the entity that has requested Presence information and will provide directly to its own display data indicating that Presence information has been sought or accessed.

The device can also give the user the option of communicating (e.g. voice, SMS message etc.) with the entity that has accessed the Presence information; by facilitating communication in this manner, it is more likely that users will actually make the call and hence generate revenue for the operator. Similarly, the server may give the entity accessing Presence information the option of messaging the user or initiating a voice call once the Presence information has been returned.

In a second aspect, there is a wireless information device programmed to:
  (a) receive data defining the identity of any entity that has requested or accessed Presence information relating to a user of the device;
  (b) display that identity together with an indication that Presence information has been sought or accessed.

A third aspect of the invention covers computer software which, when running on a wireless information device, enables the device to:
  (a) receive data defining the identity of any entity that has requested or accessed Presence information relating to the user of the device;
  (b) display that identity together with an indication that Presence information has been sought or accessed.

Such computer software may be embodied as a set of instructions on a computer readable medium, a preferred embodiment constituting a non-transitory computer readable medium.

BRIEF DESCRIPTION OF THE DRAWINGS

The invention will be described with reference to the following Figures, in which the log is referred to as a 'footprint'.

DETAILED DESCRIPTION

An implementation of the present invention is called 'Footprints' and runs on wireless information devices with the Symbian OS from Symbian Limited of London, United Kingdom.

Footprints User Interaction

Using Footprints, a wireless information device can be pushed data (e.g. instantly or at pre-defined times) if someone accesses the Presence information associated with the user of that device, or can be set to poll regularly (or on user initiation) for that information from the server.

Figure 1:
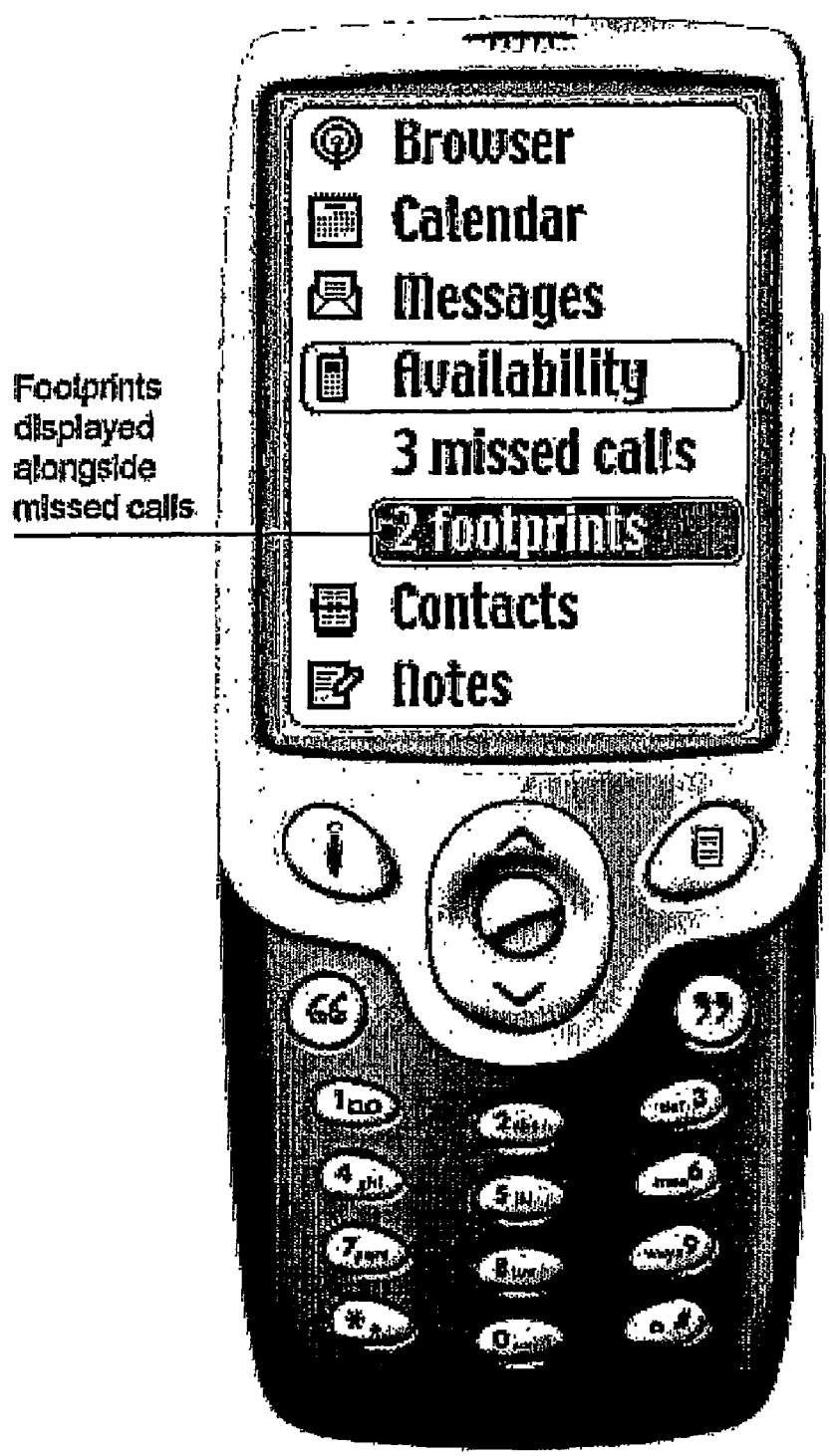
FIG. 1: shows a mobile telephone with a display showing 2 'footprints', or logs of entities who have accessed the Presence information of the user controlling that telephone.

That data can be used to display on the device an alert that someone has sought the user's Presence information: in FIG. 1, the alert '2 footprints' is shown, indicating that two entities have accessed the user's Presence Information. Automatic notification of this sort can be instantaneous (i.e. when the access takes place), can be provided to the device at regular intervals, or can be provided on specific request only. Just as a user is notified of missed calls by the cellular telephony infrastructure storing a log of all missed calls and sending that log to the mobile telephone, so can the present invention be implemented using conventional database logging and data transmission software: the same server software/hardware that is used to log missed calls and send notifications to handsets may in fact be used.

Figure 2:
FIG. 2: shows the mobile telephone with a dialog giving the user the option of viewing the 'footprints' or logs.
Figure 3:
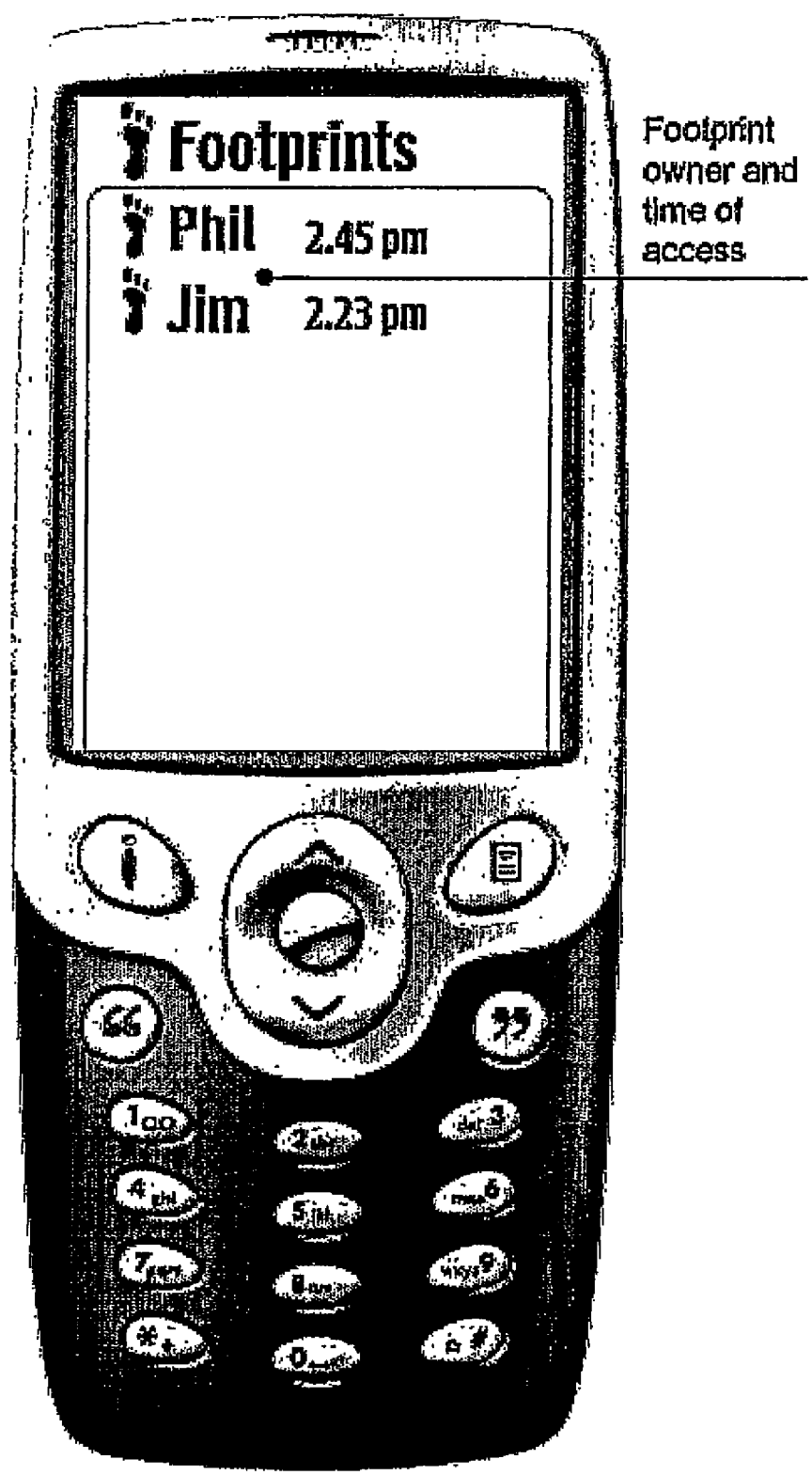
FIG. 3: shows the actual 'footprints' or logs.

If in FIG. 1 the user selects the item labelled '2 footprints', then the dialog shown in FIG. 2 is displayed: "Do you want to view these now?" with the two options "View" and "Cancel". If the "View" option is selected, then, as shown in FIG. 3, the actual identity of the persons accessing the Presence information and the time of access is shown Selecting the "View" option may require the device to ask the server for the relevant information; alternately, that information may have already been supplied to the device as stored on it.

The Figures show the device displaying Footprint information in a manner fully integrated into the user interface of the device; this will typically require the Footprint device software to be burnt into the device ROM or for the device to be able to load and run new applications such as Footprints.

Figure 4:
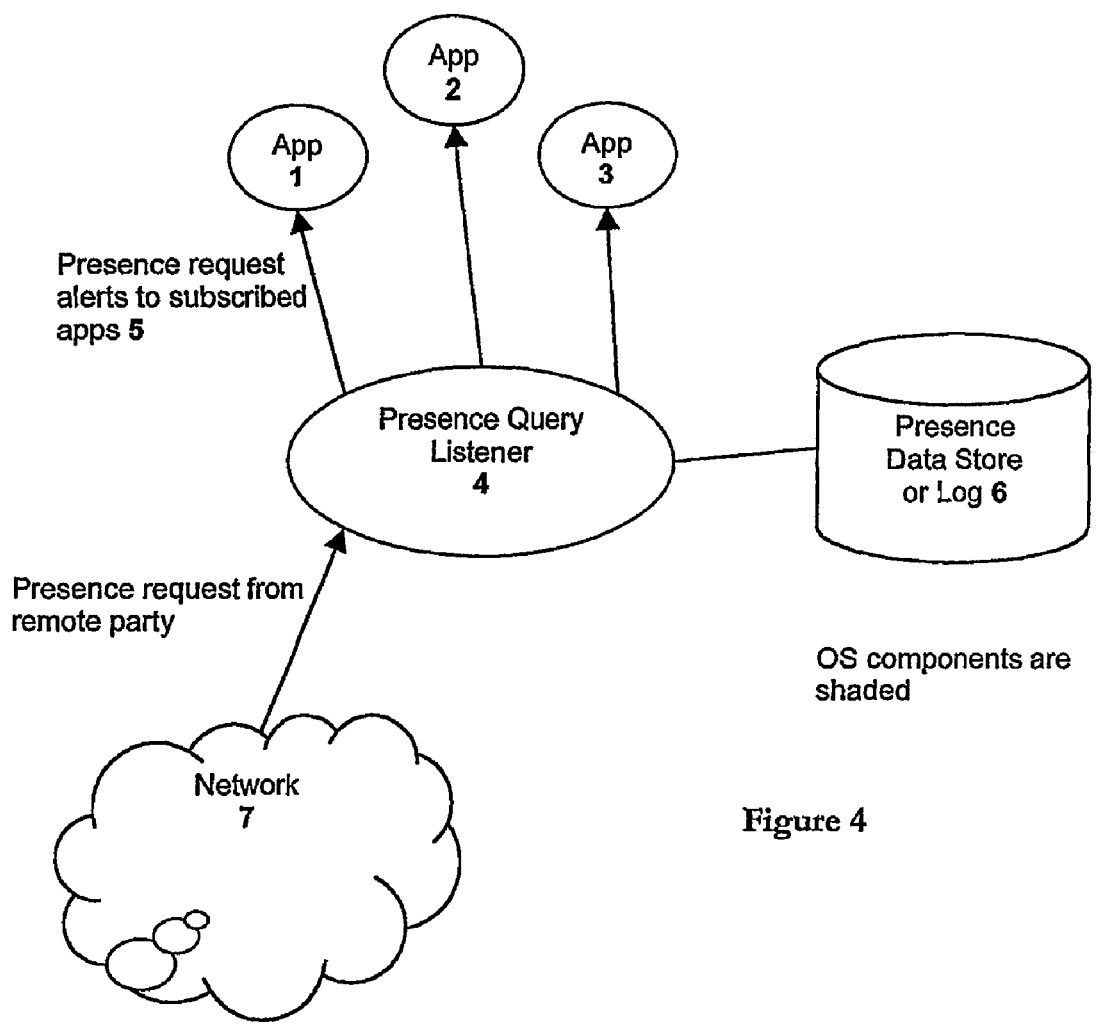
FIG. 4: shows a high level schematic of an implementation for a peer to peer Presence system.

A high level schematic for Footprints implemented on a peer to peer Presence system is shown at FIG. 4. Different applications, or apps, 1, 2 and 3 (such as the Contacts application, or Security, or indeed any application that may need to be informed of a Footprint) communicate with a 'listener' component 4 that listens for Presence requests from remote parties. This listener component 4 provides an API for apps to receive alerts 5 about incoming Presence queries. The Footprint app (or the UI extension to a Contacts app that provides this functionality) is built on top of this API. Authorised Presence queries are responded to with data being sent from the Presence Data Store 6 back over the network 7 to the requesting party, with the appropriate notification being sent to the app 1 etc. All components 1-6 are device resident, with Listener 4 and Presence Data Store 6 being part of the device OS.

A Presence architecture may be implemented in a Client/Server form: an Instant Messaging and Presence (IMP) Server holds master copies of Presence information and other 'Personal data': Personal data is non transient data (unlike Presence information) which the user wishes to store in a database that can be accessed within user defined access limits (e.g. to defined classes of individuals etc.). Personal data could include such things as: MP3 files; photos; credit card details; date of birth and other auto from fill information; medical records; Agenda; Public PGP key, etc. i.e. file, record and transaction based shared content.

The server listens for client connections and communicates directly with clients and other servers. The server also handles: data storage, user authentication, directory lookups (e.g. LDAP) and Rosters, etc. The server can log all requests for Presence information (e.g. the name of the entity requesting that information, the contact numbers, e-mails etc, the kind of Presence information sought, the time/date of access, whether access was successful or not etc.) and can send that information to the relevant client devices (e.g. users' wireless information devices).

The client device communicates with the IMP server, parses and interprets well-formed XML packets and understands message data types.

For legacy devices, such as current GSM telephones, the FIG. 4 peer to peer approach is not readily possible. However, the present invention can still be effectively implemented in a client server model by the server sending simple SMS text messages to the device if Presence information is accessed. The SMS text message may be of the form "X accessed your location information (Cinema Y) at time Z".

Returning to the overall architecture, each user is associated with a single server which receives information for them and from them. But in a typical network, there could be many IMP servers provided by the same operator, with the servers transferring messages and Presence information between themselves and, with the appropriate interoperability standards in place (e.g. SIMPLE), with other external IM and presence systems too. A Client/Server protocol (preferably an open XML-based standard) is employed for communications. This is used for client-server, server-client and server-server communication (session initiation, modification and termination). A server-to-server protocol may also be used—SIP/SIMPLE for interoperability between heterogeneous systems would be a natural design choice.

Data representation protocol: a fundamental requirement of the architecture is that it must be extensible. As such, an open XML-based standard protocol should be used for packaging/transporting data (IM, Presence data and personal information). The protocol should use XML namespaces to encapsulate other kinds of data sent, allowing any client, server, transport, or any component of the architecture to build custom applications by including their own XML data within their namespace. SOAP may be employed.

Along with a flexible messaging and presence system, an XML-based directory should be provided. As to account management, the server by default will allow every user to have full control over the creation of and management of their account. This includes passwords, and all presence, personal data and messaging aspects. Server administrators have full control over the rights allotted to each account, and can remove or limit those at any time.

The invention claimed is:

1. A method comprising:
   determining, via at least one processor, to facilitate access to at least one interface configured to allow access to at least one service, the at least one service configured to perform at least the following:
   store, at a server, presence information for a user;
   receive a request for access to said presence information from an entity;
   allow or deny access to said presence information based on a pre-defined list;
   log the identity of an entity each time the entity requests, accesses, or is denied access to the presence information;
   provide data to a wireless information terminal associated with the user for presenting the identity of the entity,
   log the time of request, access, or denial of access at the server; and
   deliver to the terminal for display the logged time of request, access, or denial of access and the identity of the entity that has requested, accessed, or been denied access to, the presence information together with a user selectable option to contact that entity using voice or message based communication.

2. The method of claim 1 in which presence information is stored on the terminal, the time of request, access, or denial of access, is logged on the terminal and then provided internally within the terminal for display on the terminal.

3. The method of claim 1 in which the kind of presence information requested, accessed, or denied access to, is logged and automatically provided to the terminal for display on the terminal instantly when an entity requests, accesses, or is denied access to, presence information; at regular times; at pre-defined times; or when requested to do so by the terminal.

4. The method of claim 1 in which the step of storing and logging presence information takes places at a server based database, programmed to automatically send some or all of the logged information to the wireless information terminal.

5. The method of claim 1 comprising providing an entity accessing presence information with the option of leaving a message to be sent to the user.

6. An apparatus comprising:
   at least one processor; and
   at least one memory including computer program code,
   the at least one memory and the computer program code configured to, with the at least one processor, cause the apparatus to perform at least the following:
   receive data defining the identity of an entity each time the entity has requested, accessed, or been denied access to presence information relating to the user of the apparatus;
   determine to display that identity together with an indication that presence information has been sought, accessed, or denied access to
   receive data defining the time at which presence information was requested, accessed, or denied access; and
   display that time
   wherein the identity of the entity that has requested, accessed, or is denied access to, the presence information is displayed on the apparatus together with a user selectable option to contact that entity using voice or message based communication.

7. The apparatus of claim 6, wherein the apparatus is further caused to:
   receive data defining the kind of presence information that was requested, accessed, or denied access to; and
   display the kind of presence information accessed.

8. The apparatus of claim 6, wherein the apparatus is further caused to display user selectable options defining when the data is to be received from a server.

9. The apparatus of claim 6, wherein the apparatus is further caused to display some or all of the following options defining when the data is to be received from a server: instantly when an entity requests, accesses, or is denied access to, presence information; at regular times; at pre-defined times; or when requested to do so by the apparatus.

10. A non-transitory computer readable storage medium carrying one or more sequences of one or more instructions which, when executed by one or more processors, cause an apparatus to at least perform the following steps:

receiving data on a wireless information terminal, said data defining an identity of an entity each time the entity has requested, accessed, or been denied access to presence information relating to a user of the terminal, receiving data defining a time at which said presence information was requested, accessed, or denied access to;

displaying on said wireless information terminal said identity of an entity together with an indication that presence information has been sought, accessed, or denied access to, and a kind of said presence information that was requested, accessed, or denied access to, together with a user selectable option to contact that entity using voice or message based communication; and displaying the time.

11. The non-transitory computer readable storage medium of claim 10 further comprising instructions for: displaying user selectable options defining when the data is to be received from a server.

12. The non-transitory computer readable storage medium of claim 11 wherein said instructions for displaying user selectable options defining when the data is to be received from a server further comprise options for receiving said data (i) instantly when an entity requests, accesses, or is denied access to, presence information; (ii) at regular times; (iii) at pre-defined times; or (iv) when requested to do so by the terminal.

13. The apparatus of claim 6, wherein the presence information is stored on the apparatus.

14. The non-transitory computer readable storage medium of claim 10, wherein the presence information is stored on said wireless information terminal.

* * * * *